United States Patent [19]

Levine et al.

[11] Patent Number: 4,695,878
[45] Date of Patent: Sep. 22, 1987

[54] COLOR TELEVISION CAMERA WITH SELECTIVELY REMOVABLE INFRARED REJECTION FILTER

[75] Inventors: Peter A. Levine, Mercer County; Arthur L. Cobb, Jr., Cherry Hill; Cydney A. Johnson, Marlton; Gary R. Peterson, Camden County, all of N.J.

[73] Assignee: RCA Corporation, Princeton, N.J.

[21] Appl. No.: 793,234

[22] Filed: Oct. 31, 1985

[51] Int. Cl.[4] .............. H04N 9/07; H04N 5/33; H04N 9/04; H04N 9/67

[52] U.S. Cl. ............................. 358/44; 358/30; 358/41; 358/50; 358/113; 358/211

[58] Field of Search ............ 358/211, 228, 41, 43, 358/44, 29 C, 30, 39, 41, 43, 50, 55, 211, 225, 228, 113

[56] References Cited

U.S. PATENT DOCUMENTS

| | | | |
|---|---|---|---|
| 3,538,335 | 11/1970 | Tartanian | 250/201 |
| 3,555,181 | 1/1971 | Thommen | 358/228 |
| 4,016,597 | 4/1977 | Dillon et al. | 358/211 |
| 4,058,827 | 11/1977 | Ando et al. | 358/55 |
| 4,160,264 | 7/1979 | Hailey et al. | 358/29 C |
| 4,327,378 | 4/1982 | Tanaka et al. | 358/228 |
| 4,437,111 | 3/1984 | Inai et al. | 358/211 |
| 4,499,497 | 2/1985 | Levine | 358/211 |
| 4,503,466 | 3/1985 | Ryan | 358/211 |
| 4,598,322 | 7/1986 | Atherton | 358/211 |
| 4,638,352 | 1/1987 | Noda et al. | 358/29 C |

FOREIGN PATENT DOCUMENTS

| | | | |
|---|---|---|---|
| 0147705 | 7/1985 | European Pat. Off. | 358/30 |
| 17795 | 2/1983 | Japan | 358/44 |
| 90887 | 5/1983 | Japan | 358/55 |
| 38996 | 2/1985 | Japan | 358/29 C |

Primary Examiner—James J. Groody
Assistant Examiner—Randall S. Svihla
Attorney, Agent, or Firm—Eugene M. Whitacre; Peter M. Emanuel; James B. Hayes

[57] ABSTRACT

A color television camera including a selectively removable infrared (IR) rejection filter and controllable weighting luminance signal matrixing circuitry features increased low-light sensitivity. During low-light conditions, the infrared rejection filter is removed from the optical path of the camera, permitting infrared light to pass to the camera's imaging means; the weighting of the controllable weighting luminance signal matrixing circuitry is altered to provide a more accurate visual representation; and the color subcarrier signal is disabled so that the camera produces only a black-and-white signal.

13 Claims, 3 Drawing Figures

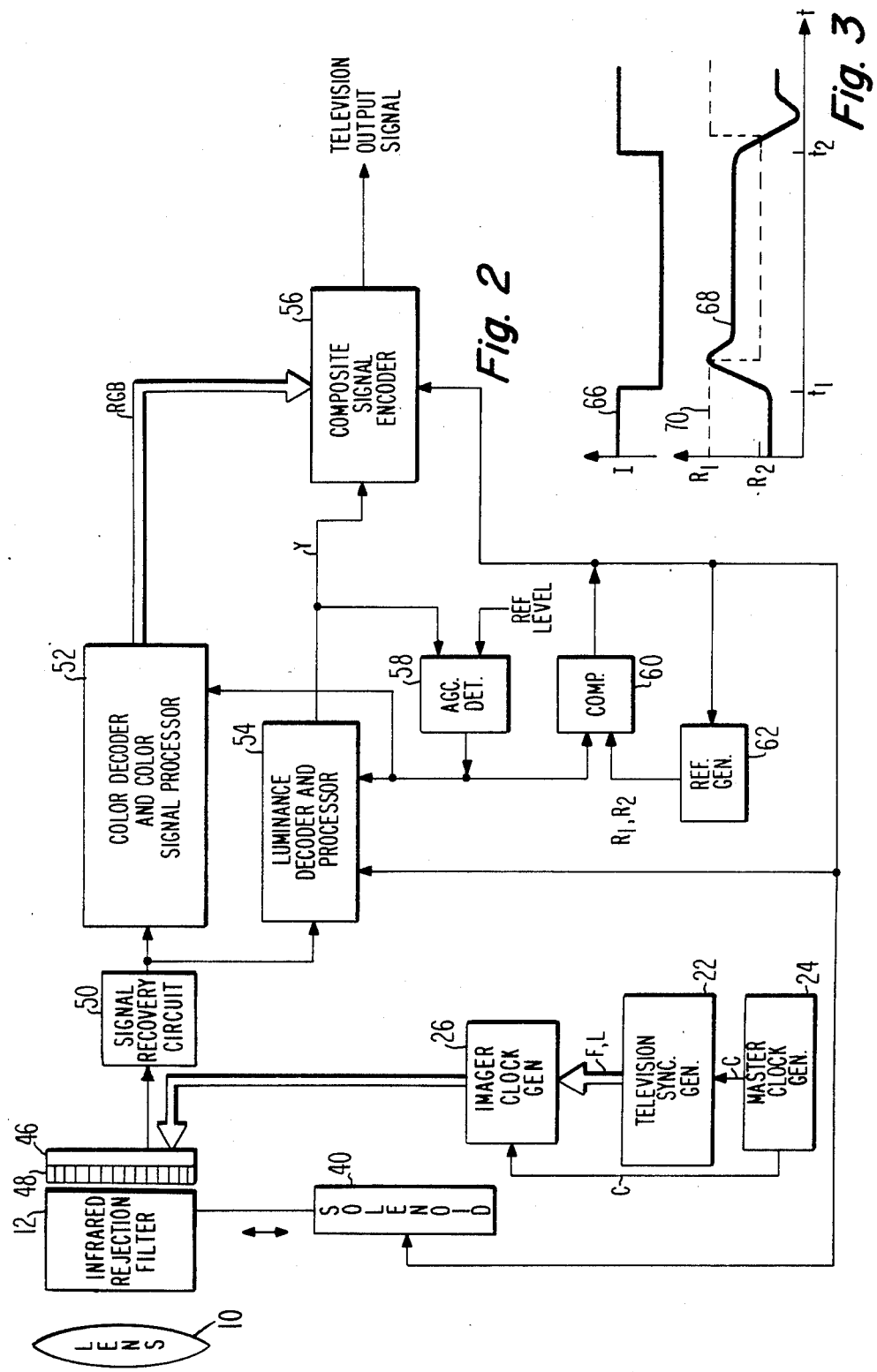

COLOR TELEVISION CAMERA WITH SELECTIVELY REMOVABLE INFRARED REJECTION FILTER

FIELD OF THE INVENTION

The present invention relates to apparatus for selectively improving the sensitivity of a television camera.

BACKGROUND OF THE INVENTION

Solid-state imagers are finding increased use in cameras for detecting radiant energy in the visible and infrared light range due to their long life, low power consumption and small size, as compared with conventional image pick-up tubes. Such solid-state imagers include commercially available charge-coupled devices (CCD), charge-injection devices (CID) and metal-oxide-semiconductor (MOS) devices which have been designed for use in television cameras for producing color television signals. Television cameras may use a single imager in combination with a color encoding filter having a stripe or checkerboard pattern or a plurality of imagers, each imager being located at a different light output port of color separation optics.

The fabrication of solid-state imager devices is typically based on silicon technology. The spectral response of silicon solid-state imagers extends to wavelengths longer than those visible to the human eye. That is, the human eye reponse drops off for wavelengths greater than 700 nm while the response of silicon imaging devices extends to approximately 1100 nm. As a result, in a color or black and white television camera including silicon images, it is necessary to include an infrared (IR) rejection filter in the camera optical path so as to obtain correct colorimetry or contrast in the picture reproduced from the imager-developed signal.

SUMMARY OF THE INVENTION

In accordance with the principles of the present invention, in a television camera including an IR rejection filter in its optical path, means are provided for selectively removing the IR rejection filter from the optical path of the camera during low light level conditions so as to increase the sensitivity performance of the camera.

BRIEF DESCRIPTION OF THE DRAWINGS

FIG. 2 illustrates, in block diagram form, a single imager color television camera constructed in accordance with the invention which includes an automatically removable IR filter; and FIG. 3 illustrates waveforms useful for understanding the operation of FIG. 2.

DESCRIPTION OF THE PREFERRED EMBODIMENTS

Figure 1:
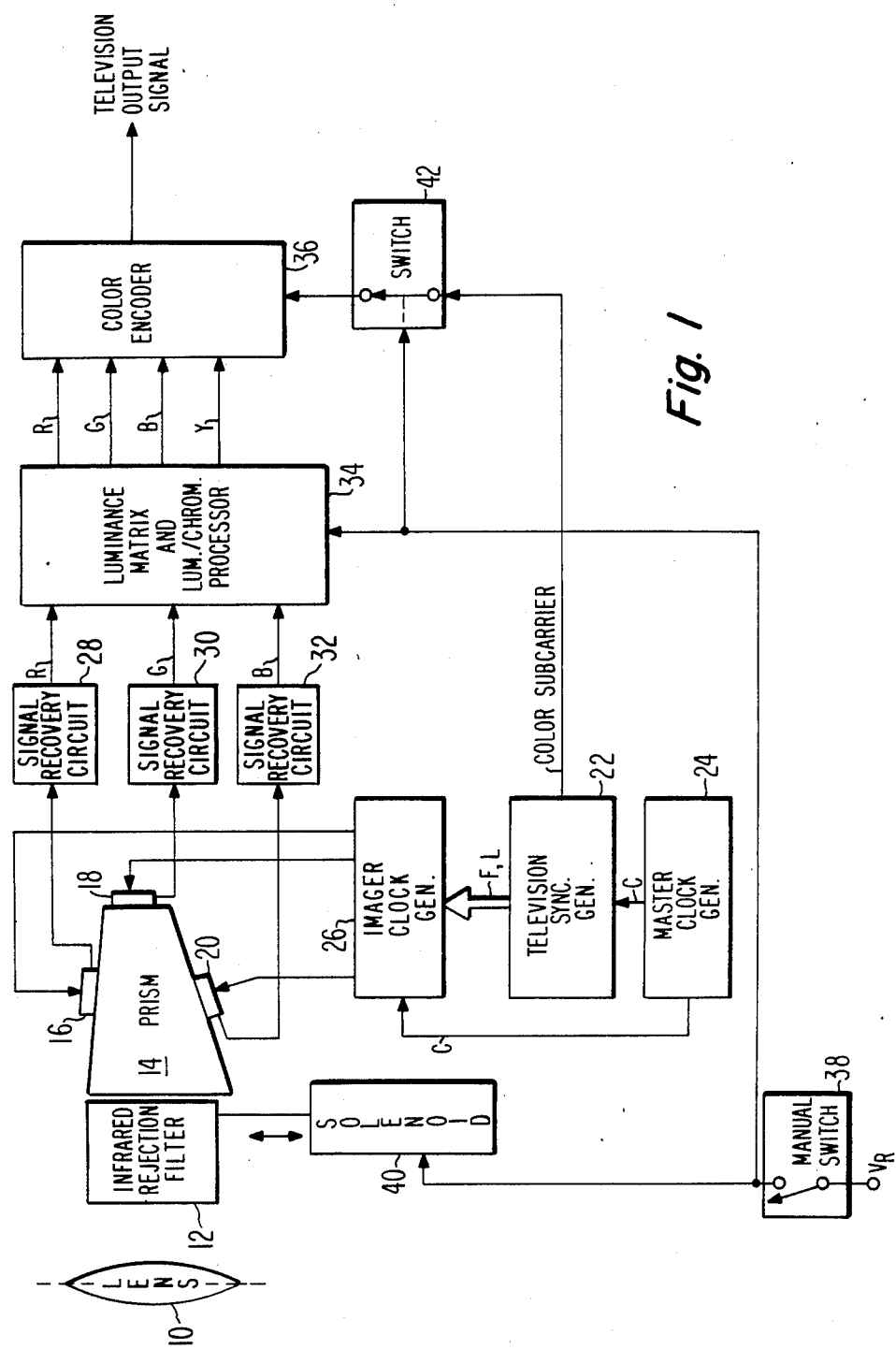
FIG. 1 illustrates, in block diagram form, a multiple-imager color television camera constructed in accordance with the invention which includes a manually removable IR filter.

FIG. 1 illustrates a color television camera including a lens 10 for directing light from a scene through an IR rejection filter 12 and onto the face of a color separating prism 14. Prism 14 includes a combination of internally reflecting surfaces and/or absorptive filters for directing the incident radiant energy to individual red (R), green (G) and blue (B) solid-state imagers 16, 18 and 20. The combination of reflecting surfaces and/or absorptive filters included in prism 14 are also selected to allow high transmission of IR radiation to imagers 16, 18, 20. Solid-state imagers 16, 18, 20 may comprise, for example, frame-transfer CCD imagers such as the RCA SID 504 CCD imager commercially available from RCA Corporation. A conventional television sync generator 22 is reponsive to signals from a master clock generator 24 for developing field (F) rate and line (L) rate signals and a color subcarrier signal as well known. The field rate and line rate signals are applied to an imager clock generator 26 along with clock (C) signals from master clock generator 24 for developing imager multiphase clock signals which are applied to imagers 16, 18 and 20. In response to the multiphase clock signals, imagers 16, 18 and 20 provide corresponding image-representative signals to signal recovery circuits 28, 30 and 32 for developing red (R), green (G) and blue (B) color signals, respectively. Signal recovery circuits 28, 30, 32 may comprise well known correlated double sampling circuits. The R, G and B signals are applied to a luminance matrix and luminance/chrominance processor 34 which matrixes the R, G and B signals for developing a luminance Y signal and R, G and B video signals. A conventional color encoder 36 processes the R, G, B and Y signals and inserts synchronizing and burst signal components for developing a television output signal as is well known.

The IR rejection filter necessarily reduces the number of photons reaching the imager, thereby degrading the signal-to-noise performance of the camera, most notably during low light level conditions and especially under incandescent illumination. In addition, for some relatively thick silicon substrate imagers, the quantum efficiency is greatest at the radiant energy wavelengths removed by the IR rejection filter, and its inclusion severely degrades the maximum sensitivity performance of the camera.

In accordance with the principles of the present invention, when the camera is operated under conditions of low light level, a switch 38 is manually closed by the camera operator which applies a reference voltage $V_R$ to solenoid 40 for causing IR rejection filter 12 to be moved out of the optical path between lens 10 and prism 14.

Since silicon imagers are relatively responsive to IR energy, the signal level of the R, G and B signals may increase substantially, i.e., by at least 200% and possibly 1000% or more depending upon the relative sensitivity of imagers 16, 18, 20 to IR energy as compared to visible light and the amount of IR energy in the incident radiation. This substantial increase of the R, G and B signal levels results in a brighter reproduced picture of substantially increased signal-to-noise ratio. However, since the human eye does not respond to IR radiation, the signal supplied by the camera when IR rejection filter 12 is removed will not precisely correspond to a visual representation of the imaged scene. Accordingly, a switch 42 which normally couples the color subcarrier signal from television sync generator 22 to color encoder 36, is opened in response to reference voltage $V_R$. This effectively removes the color components from the composite television signal and results in a black and white television signal. Additionally, luminance matrix and luminance/chrominance processor 34 is responsive to reference voltage $V_R$ for modifying the R, G and B matrix such that the Y signal is generated by only one of the R, G and B signals. For example, if the imager is relatively thick, the R signal may be the largest of the three after filter 12 is removed. Therefore, the R signal alone would be used to make the Y signal. Alternatively, since the R, G and B image-representative signal information is coherent, whereas the noise in each of these signals is incoherent, a combination of the R, G and B signals may result in a better signal-to-noise ratio luminance signal than if only one of the R, G and B signals were used. Consequently, in an alternative embodiment, all three color signals can be used for forming the television output signal. Thus, the R, G and B weighting provided by matrix 34 for developing the Y signal can be modified by reference voltage $V_R$. The present invention is particularly advantageous for use in color television electronic news gatering (ENG) and surveillance cameras, wherein lighting conditions are generally uncontrollable and a usable black and white television signal is preferable to no television signal at all.

A television camera in accordance with the invention which automatically increases its sensitivity performance at low light level conditions is shown in FIG. 2, wherein color separating prism 14 and imagers 16, 18, 20 are replaced by a single solid-state imager 46 including a color encoding filter 48 positioned in alignment over the photosensitive pixels of imager 46. Imager 46 may comprise the previously noted RCA SID 504 frame-transfer CCD imager and color encoding filter 48 may comprise one of several well known types of color stripe or checkerboard filter patterns. Imager 46 is operated via multiphase clock signals generated from clock generator 26, timing and synchronization generator 22 and master clock generator 24 and the signal read out of imager 46 is recovered by a signal recovery circuit 50 in a manner similar to the operation and signal recovery as described with respect to FIG. 1.

A conventional color decoder and color signal processor 52 is responsive to the recovered signal for developing the R, G and B image-representative signals at its output and a conventional luminance decoder and processor 54 is responsive to the recovered signal for developing the Y signal at its output. A conventional composite signal encoder 56 is responsive to the R, G, B and Y signals, and synchronization and color subcarrier signals (not shown) applied to encoder 56 from television synchronization signal generator 22, for developing a conventional television signal at its output.

An automatic gain control (AGC) detector 58 of conventional design is reponsive to the Y signal for comparing it with a reference level and developing a voltage at its output which is applied to AGC amplifiers within processors 52 and 54 for establishing desired amplitude levels for the R, G, B and Y signals. The output of AGC detector 58 increases so as to cause the AGC amplifiers of processors 52 and 54 to have a higher gain, as the incident light level is reduced to low illumination levels. Consequently, the AGC output signal can be used to determine when the camera is being operated under low light level conditions for automatically operating solenoid 40 so as to remove IR rejection filter 12 from the optical path of the camera. Thus, the AGC output signal is applied to a first input of a comparator 60 and a reference generator 62 applies a first reference level $R_1$ to its second input. When the illumination decreases to the point where the level of the AGC detector output signal exceeds the $R_1$ reference level, the output of comparator 60 changes state, for example, to a high logic level. The high logic level corresponds to the $V_R$ level described with respect to FIG. 1 and is applied to solenoid 40 for removing IR rejection filter 12 from the optical path in front of imager 46, thereby allowing a substantially greater amount of image-representative radiation to reach imager 46. It should be noted that, like the color filters included in prism 14 of FIG. 1, color encoding filter 48 is preferably transparent to IR radiation in order to maximize the increase of amplitude of the recovered signal after IR rejection filter 12 is removed. Furthermore, the high logic level signal is also applied to luminance processor 54 so as to adjust the matrix weighting it provides for developing the Y signal, thereby developing a Y signal with the best signal-to-noise ratio in a manner similar to that described with respect to FIG. 1. Additionally, the high logic level signal is applied to encoder 56, causing it to ignore the R, G and B signals, and the sync and color subcarrier signals (not shown), so that only a black and white television signal is generated.

For proper automatic operation, reference generator 62 is also responsive to the high logic level signal for providing to comparator 60 to a lower reference level $R_2$. The operation of reference generator 62 will next be described in conjunction with FIG. 3, wherein waveform 66 illustrates a decrease in incident radiation (I) during a time period from $t_1$–$t_2$ and waveforms 68 and 70 illustrate the AGC detector output signal level and switching between the $R_1$ and $R_2$ reference levels, respectively. Before time $t_1$, the AGC detector output signal level is low, since the incident radiation is high. After time $t_1$, the scene illumination decreases, causing the AGC detector output signal level to increase. When it reaches the $R_1$ reference level, comparator 60 activates solenoid 40 so as to remove IR filter 12, thereby increasing the recovered signal level and decreasing the AGC detector output signal. Furthermore, reference generator 62 changes the reference level applied to comparator 60 to be $R_2$, which level is less than the AGC detector output signal level, causing the output of comparator 60 to remain high. When the incident radiation increases at time $t_2$, the AGC detector output signal level decreases. When it reaches the point where the $R_2$ level is crossed, the output signal level of comparator 60 drops to a low signal level, switching reference generator 62 back to the $R_1$ reference level, causing solenoid 40 to put IR rejection filter 12 back into the optical path, restoring proper Y signal decoding by processor 54 and causing encoder 56 to again develop a full color signal at its output.

Although the principles of the invention have been described with reference to preferred embodiments, it should be clear that other embodiments are possible. For example, the removal of IR rejection filter 12 from the optical path by solenoid 40 could be accomplished by using a rotating filter wheel assembly or IR rejection filter 12 could be stationary and a movable mirror or other means could selectively cause the optical path to be filtered or unfiltered. Furthermore, imager 46 could comprise a diode array fabricated on the target of a television image pickup tube. These and other modifications are considered to be within the scope of the following claims.

What is claimed is:
1. A color television camera, comprising:
   imaging means responsive to incident radiation of visible wavelengths as well as additional wavelengths for developing an image-representative output signal in response to said incident radiation;

optical means for directing said incident radiation to said imaging means along an optical path;

rejection filter means for substantially blocking the passage of said additional wavelengths of said incident radiation in said optical path so that said imaging means normally responds to only said visible wavelengths of said incident radiation;

signal processing means responsive to said image-representative output signal for producing a television signal;

said signal processing means including controllable weighting luminance signal matrixing circuitry;

control means coupled to said rejection filter means for preventing said rejection filter means from substantially blocking the passage of said additional wavelengths of said incident radiation in said optical path so that said imaging means responds to both said visible and additional wavelengths of said incident radiation; and said control means also being coupled to said controllable weighting luminance signal matrixing circuitry to alter said weighting when said imaging means responds to both said visible and additional wavelengths of said incident radiation.

2. The television camera of claim 1, wherein:
said rejection filter means comprises a movable rejection filter; and
said control means is connected to said rejection filter so as to physically move it into and out of said optical path.

3. The television camera of claim 2, wherein:
said control means is controllable by the operator of the camera for manually causing said movement of said rejection filter.

4. The television camera of claim 2, wherein:
said control means is reponsive to said signal processing means for automatically causing said movement of said rejection filter in response to the level of said image-representative output signal.

5. The television camera of claim 1, wherein:
said signal processing means is responsive to said control means for selectively developing a black and white television signal when said control means prevents said rejection filter means from substantially blocking said additional wavelengths of said incident radiation in said optical path.

6. The television camera of claim 1, wherein said optical means comprises:
a color separation prism for dividing said optical path into a plurality of optical paths; and
said imaging means comprises a plurality of imagers, a respective one of each of said plurality of imagers being located in a respective one of said plurality of optical paths.

7. The television camera of claim 1, wherein said optical means comprises:
a color encoding filter positioned in the optical path and in alignment with said imaging means.

8. The television camera of claim 1, wherein:
said rejection filter means comprises a movable infrared rejection filter; and
said control means is connected to said infrared rejection filter so as to physically move said filter into or out of said optical path in response to a control signal.

9. The television camera of claim 8, wherein said signal processing means includes:
comparator means having a first input responsive to variations of said image-representative output signal, a second input responsive to a reference level signal from a reference level generator and an output for developing said control signal.

10. The television camera of claim 9, wherein:
said reference level generator couples a first reference level signal to said comparator means when said imaging means responds to only said visible wavelengths of said incident radiation and couples a second reference level signal different from said first reference level signal to said comparator means when said imaging means responds to both said visible and additional wavelengths of said incident radiation.

11. The television camera of claim 1, wherein:
said image-representative output signal includes multiple color signal components and the luminance signal matrixing circuitry of said signal processing means produces said television signal in response to a given one of said color signal components when said imaging means responds to both said visible and additional wavelengths of said incident radiation.

12. The television camera of claim 1, wherein:
said image-representative output signal includes multiple color signal components and the luminance signal matrixing circuitry of said signal processing means produces said television signal in response to a plurality of said color signal components when said imaging means responds to both said visible and additional wavelengths of said incident radiation.

13. The television camera of claim 1, wherein:
said control means is responsive to the processing of said image-representative output signal by said signal processing means.

* * * * *